Figure 1:
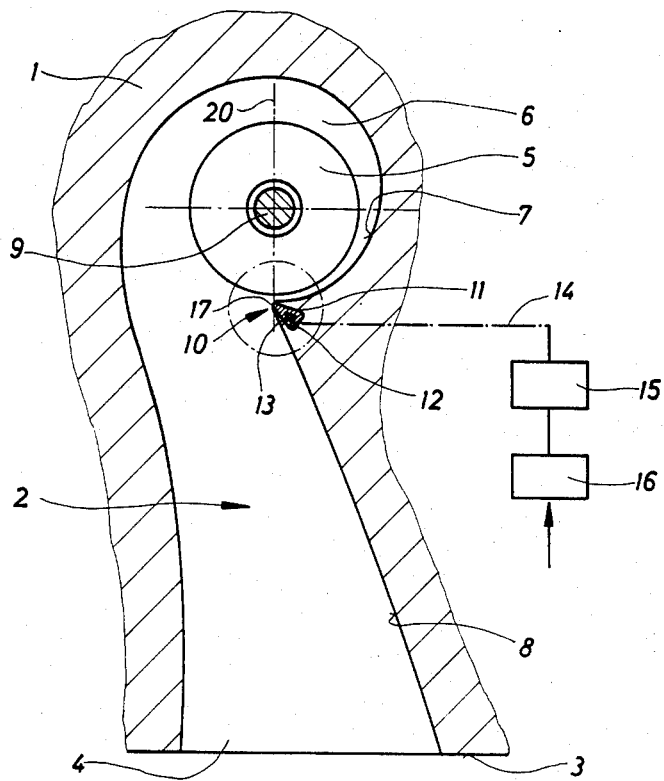

United States Patent [19]
Krömer

[11] Patent Number: 4,498,435
[45] Date of Patent: Feb. 12, 1985

[54] FUEL-INJECTION INTERNAL-COMBUSTION ENGINE

[75] Inventor: Günter Krömer, Heilbronn, Fed. Rep. of Germany

[73] Assignee: Audi Nsu Auto Auto Union Aktiengesellschaft, Fed. Rep. of Germany

[21] Appl. No.: 434,598

[22] Filed: Oct. 15, 1982

[30] Foreign Application Priority Data

Oct. 22, 1981 [DE] Fed. Rep. of Germany ....... 3141880

[51] Int. Cl.³ .............................................. F02M 35/10
[52] U.S. Cl. ................................. 123/306; 123/188 M
[58] Field of Search ............................. 123/188 M, 306

[56] References Cited

U.S. PATENT DOCUMENTS

| | | | |
|---|---|---|---|
| 4,015,577 | 4/1977 | Elsbett et al. | 123/188 M |
| 4,180,041 | 12/1979 | Miyazaki et al. | 123/188 M |
| 4,207,854 | 6/1980 | Alford et al. | 123/188 M |
| 4,381,743 | 5/1983 | Mair | 123/188 M |

FOREIGN PATENT DOCUMENTS

| | | | |
|---|---|---|---|
| 1072005 | 12/1959 | Fed. Rep. of Germany | 123/188 M |
| 0001712 | 1/1978 | Japan | 123/188 M |

*Primary Examiner*—Parshotam S. Lall
*Assistant Examiner*—W. R. Wolfe
*Attorney, Agent, or Firm*—Kane, Dalsimer, Kane, Sullivan and Kurucz

[57] ABSTRACT

In an injection-type internal-combustion engine with an air suction passage 2 designed as a twist forming passage means, the edge 10 between a curved passage section 4 and the valve chamber 6 is formed by an elastically deformable hollow body 12 located in a cavity 11. The interior of the hollow body 12 is in communication with a pressure means source 15, 16, by means of which the pressure in the hollow space is varied in dependence upon operating parameters. When pressurized the hollow body extends out of the cavity and effects a constriction of the air stream passing through passage 2 whereby the twist is increased.

4 Claims, 3 Drawing Figures

FUEL-INJECTION INTERNAL-COMBUSTION ENGINE

This invention relates to a fuel-injection internal-combustion engine, in particular, but not exclusively to diesel engines.

It is known that, for different engine speeds and load conditions, different twist or swirl values in the air supplied lead to optimal engine performance. It is known to influence this twist by providing a swingable valve in the air suction pipe or other guide means which can be pivoted in dependence upon the speed of the engine, to produce high twist at low engine speeds and relatively low twist at high speeds. As a result in spite of the relatively low air speed, a good fine atomization is achieved in the lower speed range, whilst at high speeds the throttle action, and the power loss associated therewith, is prevented as much as possible. Valves or deflecting members in the air suction pipe which are mechanically moved in this way are not, however, operationally reliable, since when the engine backfires, they are subject to high pressure loads and may be induced to vibrate, which may lead to elimination of the desired pattern of twist. Furthermore, such elements create in the air suction pipe flow resistances which reduce the rate of flow. In an engine with several cylinders, considerable difficulties arise in synchronizing the valves with one another to produce an effective and equal twist.

An object of the invention is to provide a fuel-injection internal-combustion engine including an intake passage with a twist creating device which reduces or removes some or all of these problems.

From one aspect the invention consists in a fuel-injection internal-combustion engine with direct injection, having an air suction passage formed as as twist forming passage means and comprising a curved passage section having a valve chamber joined thereto, the valve chamber enclosing an inlet valve and being substantially rotationally symmetrical to the longitudinal axis thereof, the passage section opening mainly tangentially into the valve chamber and forming an edge between one of its wall and the circumferential wall of the valve chamber, and having means for influencing the twist in the air suction passage, comprising an elastically deformable oblong hollow body which is located in an undercut cavity provided in the edge between the passage section and the valve chamber and extending substantially parallel to the longitudinal axis of the inlet valve, the hollow body being deformable by means connected to its internal space such that at least part of the hollow body can be made to project into the air suction passage in dependence upon operating parameters of the engine.

In a preferred embodiment the elastically deformable oblong hollow body forms the said edge between the passage section and the valve chamber, in the area of the narrowest point of the air suction pipe. Hence the laminer boundary layer of the air flowing through the passage can be influenced in the most effective way at relatively low constructional expense, so that the twist is increased when the hollow body is deformed to project from its cavity. Therefore it is possible to construct the air suction passage in such a way that it creates, for the nominal speed of the engine, an optimal twist which is relatively small, in order to produce as small as possible a throttle action and hence a high flow of air towards the valve. At speeds lying below the nominal speed the twist can be increased, for example, by pneumatically or hydraulically pressurizing the hollow body with a fluid medium such as, for example, oil, to alter its volume. Advantageously the pressure of the fluid fed into the hollow body is increased as the speed drops. In practice it has been shown that the twist can be influenced in the desired way with a small variation in the volume of the hollow body. The use of a cavity, from which the hollow body projects only when actuated, enables the true shape of the air suction passage to be maintained, and at the same time the hollow body is prevented from forming a flow resistance in those operating ranges in which the engine is running at nominal speed.

The cavity can have an undercut cross-section. With this design, not only can the cavity be incorporated in a simple way from an outside face, but the hollow body can be reliably accepted and retained. As the twist can be most advantageously influenced in the area of the narrowest point of the air suction passage, it is furthermore proposed, depending upon the design of the suction passage, that the longitudinal central plane of the cavity be aligned towards the transition between the valve chamber and the passage section and lie between a plane which intersects the longitudinal axis of the inlet valve and the said edge and a plane running at right angles to this plane.

To actuate the hollow body, the hollow body can, for example, be connected to an air pump via a pressure control valve located in a feed pipe. In this case the valve can be controlled in accordance with operating parameters of the engine. In an engine having several cylinders, the simultaneous operation of the hollow bodies can be synchronized by means of the pressure control valve.

A simple design can be produced if the hollow body is formed from a hose. Good heat resistance can be achieved if the hollow body is composed of silicon rubber.

Figure 2:
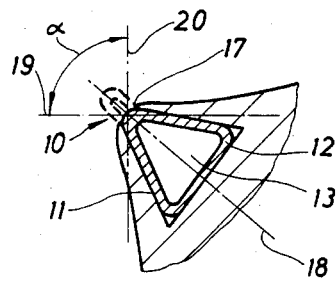
Figure 3:
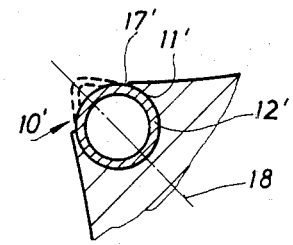

The invention may be performed in various ways and specific embodiments will now be described, by way of example, with reference to the accompanying drawings, in which:

FIG. 1 shows a longitudinal section through an air suction passage which is formed as a twist forming passage means, FIG. 2 shows the area A marked with a circle in FIG. 1 on an enlarged scale in a first specific embodiment, and FIG. 3 shows the area as in FIG. 2 in a second embodiment.

The segment of a cylinder head 1 of an engine, which is shown in a simplified form in FIG. 1, contains an air suction passage 2, which is designed as a twist forming passage means, and comprises a curved passage section 4 and a valve chamber 6, which encloses an inlet valve 5 and is rotationally symmetrical to the longitudinal axis 9 thereof. The passage section 4 extends from the outside face 3, and opens tangentially into the valve chamber 6. In this construction, the circumferential wall 7 of the valve chamber 6 and the wall 8 of the passage section 4, which is on the right-hand side in the drawing and which is in close alignment with the longitudinal axis 9, converge on an edge 10 which runs mainly parallel to the longitudinal axis 9.

The air suction passage 2 is, for example, so designed that it creates a twist which is optimal for the nominal engine speed, but which is too small for running at low speeds. In order to produce the desired high twist at these low speeds, the edge 10 is composed of a part of an elastically deformable hollow body 12, which is inserted into a cavity 11 extending over the the whole length of the edge 10. The cavity 11 is, for example, dovetailed in cross-section in order to prevent the hollow body 12 from dropping out. The hollow body 12 is constituted by a hose which is closed at its one end, and which, because of the operating temperature of approximately 100° C. prevailing in this area, is composed of heat-resistant material such as, for example, silicon rubber. The hollow internal space 13 of the hollow body 12 is connected with a pressure source 15 via a diagrammatically illustrated pipe 14. The pressure source 15 has, for example, a pressure tank containing a diaphragm, or a pressure cylinder containing a piston, and forms with the pipe 14 and the hollow body 12, a closed hydraulically or pneumatically operating system.

The pressure source 15 is controlled by a regulator 16 in such a way that the pressure of the medium which is in the system at low engine speeds is higher than at high speeds. The result of this is that the hollow body increases its volume, when there is an increase in pressure, and thereby projects to a greater extent from the opening 17 of the cavity 11. The air flowing through the air suction passage 2 is correspondingly influenced in its boundary layer, so an increase in twist occurs. Conversely, as the speed increases the pressure in the hollow body is lowered and the edge retracts. Hence the twist created is, as desired, at the maximum at low speeds and at the minimum at high speeds. The aforementioned regulator 16 is controlled in dependence upon operating parameters such as, for example, the load or temperature, but preferably by the speed which is illustrated by an arrow.

As is evident from FIG. 2, the cavity 11 is pointing with its opening 17 or with its longitudinal central plane 18 towards the transition of the air section passage 2 from the passage section 4 and the valve chamber 6. The opening 17, depending upon the design of the air suction passage 2, can point in any direction, which lies within an angle α which is formed between a plane 20 intersecting the longitudinal axis 9 and the edge 10 and a plane 19 running at right angles to this plane 20. Furthermore, the drawing shows how the hollow body 12 swells from the rest position shown, beyond the opening 17 when pressurised, and how the edge 10 can be moved by up to approximately 1 mm in order to increase the twist.

In the exemplified embodiment shown in FIG. 3, the same reference numbers have been used, as in the embodiment in FIG. 1 and FIG. 2, for identical and similar parts, but with a stroke. The cavity 11', in this case has a circular cross-section. The hollow body 12' can therefore have a corresponding circular cross-section instead of an angular profile. The cavity 11' is simpler to manufacture. Whilst the cavity shown in FIG. 1 and FIG. 2 has to be made by broaching or slotting techniques, for example, the cavity 11' can be drilled or milled. If an increase in pressure occurs inside the hollow body 12', the hollow body 12' can swell beyond the opening 17'—as indicated—whereby the edge 10' is similarly moved by up to approximately 1 mm in order to increase the twist.

I claim:

1. A fuel-injection internal-combustion engine with direct injection, having an air suction passage formed as a twist forming passage means with walls and comprising a curved passage section having a valve chamber with a circumferential wall joined thereto, the valve chamber enclosing an inlet valve and said circumferential wall being substantially rotationally symmetrical to the longitudinal axis of said inlet valve, the passage section opening mainly tangentially into the valve chamber and forming an edge between one of said passage walls and the circumferential wall of the valve chamber, and having means for influencing the twist in the air suction passage comprising an elastically deformable hollow body which is located in an undercut cavity provided in the edge and extending substantially parallel to the longitudinal axis of the inlet valve, the hollow body being deformable by pressure means connected to its internal space such that at least part of the hollow body can be made to project in to the air suction passage in dependence upon operating parameters of the engine.

2. An engine as claimed in claim 1, wherein said hollow body swells under pressure along a longitudinal central plane of the cavity which is aligned with the transition between the valve chamber and the passage section and lies between a valve plane which intersects the longitudinal axis of the inlet valve and the said edge and a plane which runs at right angles to said valve plane.

3. An engine as claimed in claim 1 or claim 2, wherein the inside space of the hollow body communicates with an air pump via pressure control valve, whereby the valve can be controlled in dependence upon the operating parameters of the engine.

4. An engine as claimed in claim 3, wherein the hollow body comprises a silicon rubber hose extending substantially along said edge.

* * * * *